(No Model.) 2 Sheets—Sheet 1.
L. J. HIRT.
JOURNAL BOX.
No. 545,018. Patented Aug. 20, 1895.
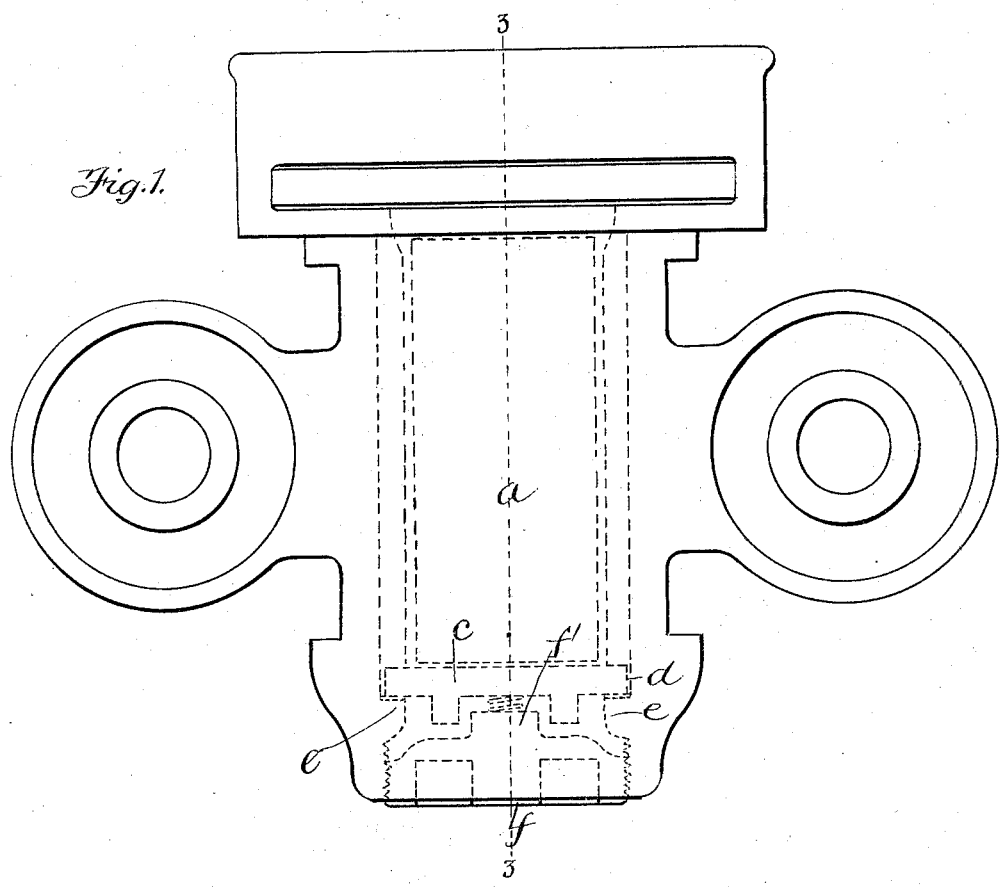
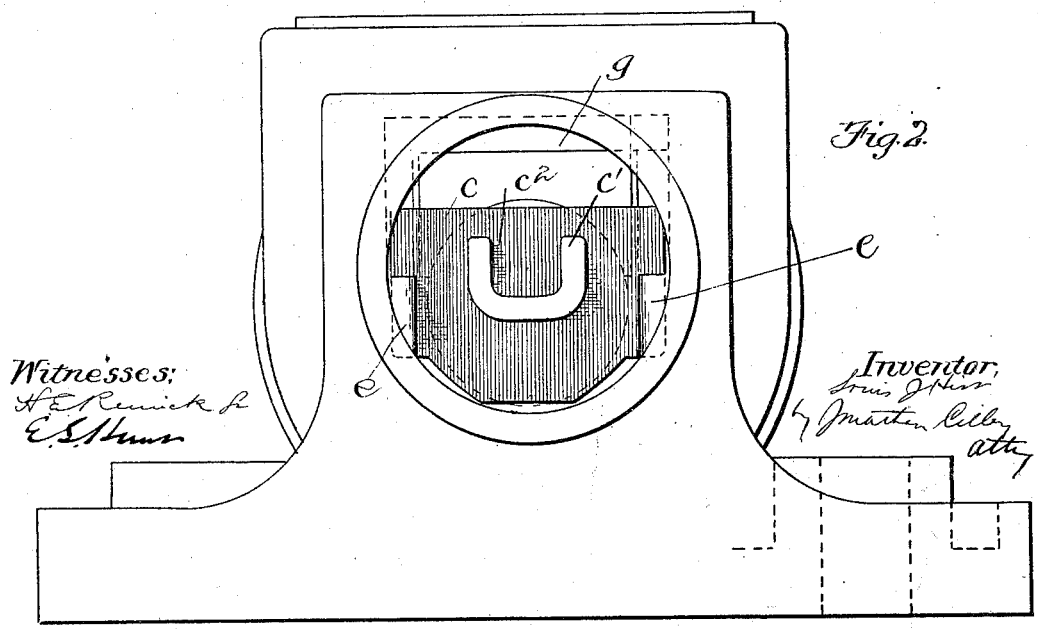

(No Model.) 2 Sheets—Sheet 2.
L. J. HIRT.
JOURNAL BOX.
No. 545,018. Patented Aug. 20, 1895.
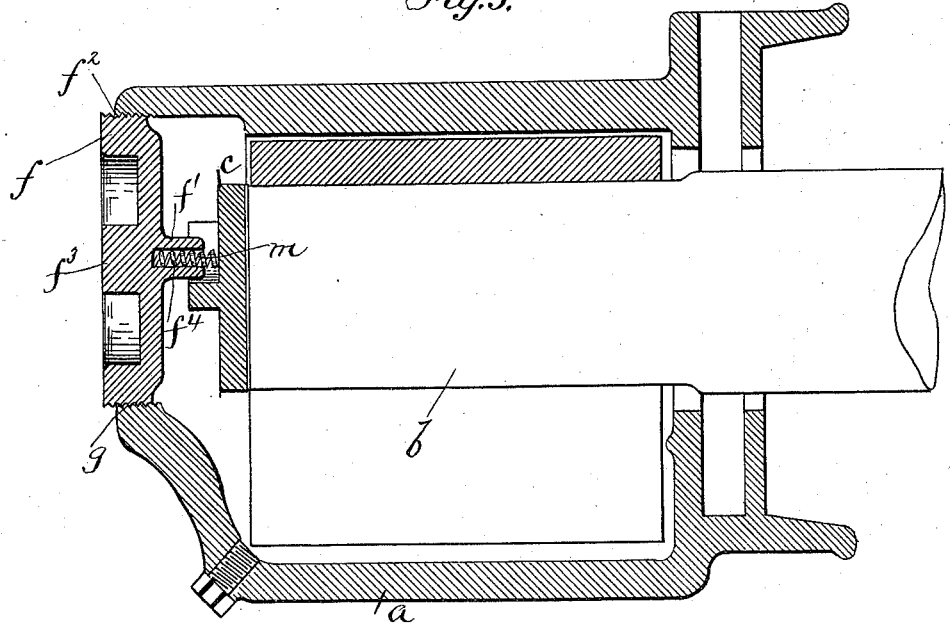
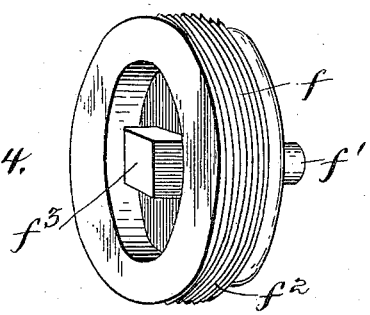
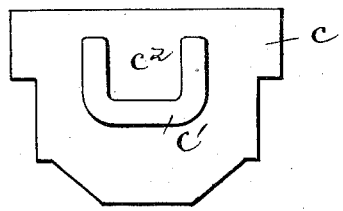
Witnesses:
Inventor,

UNITED STATES PATENT OFFICE.

LOUIS J. HIRT, OF BOSTON, MASSACHUSETTS.

JOURNAL-BOX.

SPECIFICATION forming part of Letters Patent No. 545,018, dated August 20, 1895.

Application filed March 28, 1893. Serial No. 468,056. (No model.)

*To all whom it may concern:*

Be it known that I, LOUIS J. HIRT, of Boston, in the county of Suffolk and State of Massachusetts, have invented a new and useful Improvement in Journal-Boxes, of which the following is a specification.

In the accompanying drawings, forming part of the specification, Figure 1 is a top view of a journal-box embodying my invention; Fig. 2, a front view with the cap removed; Fig. 3, a partial section on the line 3 3 of Fig. 1; Fig. 4, a perspective of the cap, and Fig. 5 a detail of the thrust-plate.

The casing $a$ incloses the end of axle $b$, as usual, the other parts not lettered being too well known to require description.

The thrust-plate $c$ is supported in recesses $d$ and held against displacement flatwise by shoulders $e$. Projection $c'$ forms a recess $c^2$, into which extends a projection $f'$ on cap $f$. In the form shown, cap $f$ is threaded on its periphery at $f^2$ and is inserted into a threaded opening $g$ in casing $a$. A squared portion $f^3$ provides means for removing cap $f$. Projection $f'$ is preferably made with a tubular socket $f^4$ and receives spring $m$, which engages thrust-plate $c$.

Thrust-plate $c$ is thus held against vertical displacement by projection $f'$, and spring $m$ prevents rattling of the thrust-plate.

Cap $f$, it will be observed, can be screwed up until it is flush with the casing, when no projecting part is exposed to be struck by passing vehicles.

It will be understood that I am not limited to the precise arrangement shown, and that the improved cap can be used to advantage with a variety of journal-boxes.

Having now described what I deem the best embodiment of my invention, what I desire to secure by Letters Patent, and therefore claim, is—

1. In a journal box, the combination with the casing to receive the journal and provided with a screw-threaded opening $g$, of a cap $f$ screw-threaded on its periphery to engage the screw-threaded opening $g$, a thrust-plate in said casing and means interposed between the said cap and thrust-plate to prevent vertical displacement of the said thrust-plate, substantially as described.

2. In a journal box, the combination with a casing to receive the journal and provided with an opening substantially in line with said journal, of a thrust-plate located in said casing in line with the said journal, and a cap seated in said opening and provided with a projection on its inner side to engage the thrust-plate and prevent vertical displacement of the said thrust-plate, substantially as described.

3. In combination, a casing; a thrust-plate $c$ provided with a recess $c^2$; a cap $f$ having a projection $f'$ on the inner face entering the recess, and a spring $m$ carried by the projection and engaging the thrust-plate, as described.

4. In a journal box, the combination with a casing to receive the journal and provided with an opening substantially in line with said journal, of a removable thrust-plate located in said casing and disconnected from the journal, a cap to close said opening, and means interposed between the said cap and thrust-plate to prevent vertical displacement of the said thrust-plate substantially as described.

In testimony whereof I have hereunto signed my name in the presence of two subscribing witnesses.

LOUIS J. HIRT.

Witnesses:
 JONATHAN CILLEY,
 W. P. PLUMMER.